United States Patent Office 3,265,692
Patented August 9, 1966

3,265,692
PROCESS FOR THE PREPARATION OF
OXADIAZOLE DERIVATIVES
Kálmán Harsányi, Pál Kiss, Dezsö Korbonits, Ilona Malyata, Ilona Erdélyi, Laszló Tardos, and György Leszkovszky, all of Budapest, Hungary, assignors to Chinoin Gyogyszer-es Vegyeszeti Termekek Gyara RT, Budapest, Hungary
No Drawing. Filed Mar. 19, 1964, Ser. No. 353,270
Claims priority, application Hungary, Mar. 22, 1963, CI 437; Mar. 29, 1963, CI 438
8 Claims. (Cl. 260—247.5)

This invention relates to the preparation of oxadiazole derivatives. More particularly it is concerned with 1,2,4-oxadizoles substituted in their positions 3 and 5.

1,2,4-oxadiazole derivatives can be prepared according to several known methods. They can be prepared by subjecting esters of amidoximes to pyrolysis at a temperature exceeding the melting point of the ester. [Ber. 20, 226 (1887); Ber. 22, 2456 (1889)]. Another known method comprises ring-closure of the esters of amidoximes in the presence of a solvent. Acetic acid anhydride is used as water-binding agent, while a solvent of the toluene-type is added for the distillation of the water formed. Another process (German specification No. 1,097,998) comprises a combination of the above method and of the substitution reaction of the secondary amine with the omega-halogeno-acyl-amidoxime. Acidic or basic agents (sulfuric acid, sodium hydroxide) promote the ring-closure of the esters.

According to a further method one may proceed by heating amidoximes with acid chlorides or with acid anhydrides. It is also known, that 1,2,4-oxadiazoles may be prepared by reacting amidoximes with acetoacetic ester in toluene as medium and distilling off the axeotropic mixture of the formed alcohol and water. Bull. Soc. Chim. Belg. 56, 339, 1947).

It has been found that compounds of the general formula

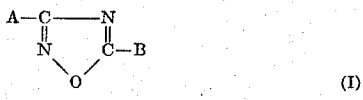

(I)

may be prepared with good yields and in a highly pure form by reacting amidoximes of the general formula

(II)

with esters of the general formula

(III)

where in the formulae

A stands for alkyl, cycloalkyl, aryl or heterocyclic radical, which radicals may be substituted,
B stands for an alkyl, cycloalkyl, aryl or heterocyclic radical, which radicals may be substituted and
$B^1$ has the same meaning as B or when B stands for a hydroxy group the meaning of $B^1$ is the group —OR where R stands for an alkyl group in the presence of alkaline alcoholates or alkaline earth alcoholates.

The process of the present invention can be used advantageously when preparing compounds in which the groups A and/or B are substituted by $NH_2$, OH, alkoxy, acylamino, alkylamino or dialkylamino groups. When the groups A and/or B are of aromatic character the molecule may contain further substituents, preferably alkyl and/or halogen groups. The groups of aromatic character may be aromatic or heterocyclic.

When the groups A and/or B stand for alkyl groups, they may be further substituted by aryl or heterocyclic groups.

The reaction is carried out advantageously at 50–120° C. in the presence of alcohols. 0.1–2.0 moles, preferably 1 mole, of the alkali alcoholate or the corresponding quantity of alkaline-earth alcoholate is used (calculated on the amidoxime). The ester component of the Formula III is added preferably in an exces of 0.1–1.5 moles, calculated on the amidoxime. According to a preferred method of the invention one may proceed by boiling the alcoholic solution of the components. The process of the present invention can be used advantageously for the preparation of oxadiazole derivatives, containing substituents of basic character.

The reaction mixture is worked up according to several methods, depending on the physical properties of the desired product. When the compound formed is but slightly soluble in aqueous alcohol it can be participtated by diluting the mixture with water. Another method comprises evaporating the solvent and dissolving the residue in water. 1,2,4-oxadiazole-5-one derivatives are soluble in alkaline aqueous solutions and can be isolated by acidifying the solution.

Certain compounds precipitate in the form of an oily product after evaporating the alcohol and diluting the residue with water. In this case the product may be isolated by extraction with a solvent and evaporating the same. 1,2,4-oxadiazole derivatives containing substituents of basic character may be obtained by preparing their salts formed with mineral or organic acids.

The compounds prepared according to the process of the invention may be used in therapy as spasmolytics or antitussive agents.

Further details of the process are to be found in the examples.

*Example 1*

4.80 g. of beta,beta-diphenylpropionyl-amidoxime are boiled for 8 hours with 3.82 g. of beta-morpholino-propionic acid ester and with sodium alcoholate prepared of 0.92 g. of sodium in 50 ml. of anhydrous ethanol. The alcohol is distilled off, whereupon the residue (6.51 g.) is crystallized from a mixture of benzene and petrol. 1.58 g. of the unchanged amidoxime are thus recovered. On evaporating the mother lye, 4.31 g. of a red oil are obtained. The hydrochloric acid salt is prepared with alcohol containing hydrochloric acid and the salt may be crystallized from anhydrous alcohol. Thus crystalline 3-(beta,beta-diphenyl-ethyl)-5 - (beta-morpholinoethyl)-1,2,4-oxadiazole hydrochloride is obtained. The product may be recrystallized from anhydrous alcohol. M.P.: 171° C. Analysis: N=10.48% (calc. 10.51%).

*Example 2*

6.8 g. of benzamidoxime are boiled with 18.7 g. of beta-morpholino-propionic acid ester for 8 hours in the presence of sodium ethylate prepared of 1.15 g. of sodium in 100 ml. of anhydrous alcohol. The reaction mixture is worked up by evaporating the ethanol, adding 2.0 g. of sodium hydroxide in 100 ml. of water and extracting with benzene. On evaporating the benzene solution a residue of 10.55 g. is obtained, from which 10.32 g. of 3-phenyl-5-(beta-morpholino-ethyl)-1,2,4-oxadiazole hydrochloride are precipitated with anhydrous alcohol containing hydrochloric acid. M.P.: 202° C. (prepared according to the German Patent No. 1,097,998 the melting point of the same compound is described to be 190–192° C.). Analysis: C=56.97% (calc. 56.85%); H=6.11% (calc. 6.13%); Cl=11.99% (calc. 12.00%).

Example 3

6.8 g. of benzamidoxime are boiled with 17.1 g. of beta-pyrrolidino-propionic acid ester for 9 hours in the presence of sodium ethylate prepared of 1.15 g. of sodium in 100 ml. of anhydrous alcohol. The reaction mixture is worked up according to the process described in Example 2. The residue of the benzene solution weighs 10.82 g. On addition of anhydrous alcohol containing hydrochloric acid 8.88 g. of 3-phenyl-5-(beta-pyrrolidino-ethyl)-1,2,4-oxadiazole are obtained; M.P. 185° C. (according to the German Patent No. 1,097,998 the melting point of the same compound was stated to be 166–168° C.). Analysis: Cl=12.73% (calc. 12.67%).

Example 4

6.8 g. of benzamidoxime are boiled with 17.3 g. of beta-diethylamino-propionic acid ethylester in the presence of sodium-ethylate prepared of 1.15 g. of sodium in 100 ml. of anhydrous ethanol. The reaction mixture is worked up according to the process described in Example 2. The residue of the benzene solution weighs 11.65 g., from which 3-phenyl-5-(beta-diethylamino-ethyl)-1,2,4-oxadiazole hydrochloride is obtained. M.P.: 162° C. Analysis: C=59.65% (calc. 59.67%); H=7.22% (calc. 7.15%).

Example 5

A sodium ethylate solution is prepared from 0.23 g. of sodium and 10 ml. of anhydrous ethanol. 2.40 g. of beta,beta-diphenyl-propionyl-amidoxime and 2.72 g. of methylbenzoate are dissolved in 15 ml. of anhydrous ethanol and the solution is added to the sodium ethylate solution. The reaction mixture is boiled on a water bath for 6 hours, 50 ml. of water are added whereupon the precipitate dissolves partly. The mixture is filtered whereupon 2.40 g. of 3 - (beta,beta-diphenyl-ethyl)-5-phenyl-1,2,4-oxadiazole are obtained, M.P.: 109° C. On recrystallization from 96% ethanol the melting point of the product amounts to 113° C. Analysis: C=81.20% (calc. 80.96%); H=5.62% (calc. 5.56%).

Example 6

2.30 g. of sodium are dissolved in 50 ml. of anhydrous ethanol and the solution of 21.0 g. 3,4-dimethoxy-phenyl-acetamidoxime, 23.60 g. of diethylcarbonate and 150 ml. of anhydrous ethanol is added. The reaction mixture is boiled for 8 hours, whereupon the alcohol is distilled off and the residue is dissolved in 450 ml. of water. On acidifying the solution 16.92 g. of 3-(3,4-dimethoxy-benzyl)-1,2,4-oxadiazole precipitates. The product is crystallized from ethanol, M.P. 141° C. Analysis: C=55.97% (calc. 55.92%); H=4.95% (calc. 5.12%); N=11.91% (calc. 11.86%).

Example 7

15.02 g. of phenylacetamidoxime and 37.4 g. of beta-morpholino-propionic acid ethyl ester are dissolved in 200 ml. of anhydrous ethanol for 8 hours in the presence of sodium ethylate prepared of 2.3 g. of sodium. The alcohol is distilled off, whereupon 200 ml. of water and 4.0 g. of sodium hydroxide are added to the residue. On shaking the product becomes oily and is then extracted with benzene. The distillation residue of benzene weighs 23.85 g. On addition of 100 ml. of anhydrous ethanol containing hydrochloric acid 23.27 g. of 3-benzyl-5-(beta-morpholino-ethyl)-1,2,4-oxadiazole hydrochloride are obtained. Analysis: N=13.20% (calc. 13.56%).

Example 8

15.02 g. of phenylacetamidoxime and 34.25 g. of beta-pyrrolidino-propionic acid ethyl ester are boiled for 8 hours in the presence of sodium ethylate prepared of 2.3 g. of sodium in 200 ml. of anhydrous ethanol. The reaction mixture is worked up according to the process described in the previous example. The distillation residue of the benzene solution weighs 24.80 g. from which 21.57 g. of 3-benzyl-5-(beta pyrrolidino-ethyl)-1,2,4-oxadiazole-hydrochloride are obtained on addition of ethanol containing hydrochloric acid. On crystallization from anhydrous ethanol the melting point amounts to 156° C. Analysis: N=13.94% (calc. 14.30%); Cl=12.16% (calc. 12.07%).

Example 9

9.23 g. of p-chloro-phenylacetamidoxime and 16.62 g. of salicylic acid ethyl ester are boiled for 8 hours in 100 ml. of anhydrous ethanol in the presence of sodium ethylate prepared of 1.15 g. of sodium. The alcohol is distilled off, whereupon the residue is heated for an hour with 100 ml. of water. The reaction mixture is extracted with benzene, and the solvent is evaporated. The residue (14.50 g.) is crystallized from methanol. Thus 3-(p-chloro - benzyl) - 5 - (o - hydroxy - phenyl) - 1,2,4-oxadiazolehydrochloride is obtained. M.P. 108° C. Analysis N=9.93% (calc. 9.77%).

Example 10

27.42 g. of nicotinic acid amidoxime and 47.25 g. of anhydrous diethylcarbonate are boiled for 8 hours in 400 ml. of anhydrous ethanol in the presence of sodium ethylate prepared of 4.6 g. of sodium. The alcohol is distilled off, the residue is dissolved in 190 ml. of water, whereupon on addition of 20 ml. of anhydrous acetic-acid 20.95 g. of 3-(3-pyridyl)-1,2,4-oxadiazol-5-one precipitates. The product may be crystallized from water. M.P. 231° C. Analysis: N=25.57% (calc. 25.60%).

Example 11

6.86 g. of benzamidoxime and 8.81 g. of ethylacetate are boiled for 8 hours in 40 ml. of anhydrous alcohol in the presence of sodium ethylate prepared of 1.15 g. of sodium. The alcohol is evaporated, the residue is heated with 70 ml. of water and 2.0 g. of sodium hydroxide. The isolated oily layer is extracted with benzene. On evaporating the solvent 4.6 g. of 3-phenyl-5-methyl-1,2,4-oxadiazole-5-one are obtained. M.P. 40.5° C. Analysis: N=17.43% (calc. 17.49%).

Example 12

13.6 g. of benzamidoxime and 27.2 g. of methyl-benzoate are boiled for 8 hours in 200 ml. of anhydrous alcohol in the presence of sodium ethylate prepared of 2.3 g. of sodium. The reaction mixture is worked up according to the process described in the previous example. Thus 18.5 g. of 3,5-bis-phenyl-1,2,4-oxadiazole are obtained. M.P.: 112° C. Analysis: N=12.48% (calc. 12.61%).

Example 13

7.41 g. of acetamidoxime and 27.2 g. of benzoic acid methylester are boiled for 8 hours in 100 ml. of anhydrous alcohol in the presence of sodium ethylate prepared of 2.3 g. of sodium. The reaction mixture is worked up according to the process described in Example 11. Thus 11 g. of 3-methyl-5-phenyl-1,2,4-oxadiazole are obtained. M.P. 57° C. Analysis: N=17.01% (calc. 16.86%).

Example 14

10.0 g. of benzamidoxime and 17.41 g. of anhydrous diethyl carbonate are boiled in 100 ml. of anhydrous ethanol in the presence of sodium ethylate prepared of 1.69 g. of sodium. The alcohol is evaporated, the residue is dissolved in 25 ml. of water and the solution is acidified with concentrated hydrochloric acid. The precipitated crude product weighs 8.53 g., M.P. 194–201° C. On recrystallization from anhydrous alcohol pure 3-phenyl-1,2,4-oxadiazole-5-one is obtained. M.P.: 204° C. Analysis: N=17.02% (calc. 17.28%).

Example 15

13.8 g. of nicotinic acid amidoxime and 50.8 g. of beta,beta-diphenyl-propionic acid ethyl ester are heated in 200 ml. of anhydrous ethanol for 9.5 hours in the presence of sodium ethylate prepared of 2.3 g. of sodium. The alcohol is distilled off, 100 ml. of water and 4 g. of sodium hydroxide are added to the residue, whereupon it is heated on a water-bath for an hour. On extraction with chloroform and evaporation of the solvent 32.6 g. of 3-(3-pyridyl)-5-(beta,beta-diphenyl-ethyl)-1,2,4-oxadiazole are obtained. The product may be recrystallized from 50% aqueous alcohol. M.P.: 131–133° C. Analysis: N=13.02% (calc. 12.84%).

*Example 16*

8.3 g. of 2-ethyl-isonicotinic-acid-amidoxime and 23.1 g. of 3-phenyl-5-methyl-isoxazole-4-carbonic acid ethyl ester are heated in 100 ml. of anhydrous ethanol for 8 hours in the presence of sodium ethylate prepared of 1.11 g. of sodium. The alcohol is evaporated, the residue is mixed with 100 ml. of water, whereupon the reaction mixture is heated on a water-bath for 1.5 hours. On cooling the solution 16.75 g. of crystalline 3-(2-ethyl-4 - pyridyl - 5 - [3 - phenyl - 5 - methyl - isoxazolyl-(4)]-1,2,4-oxadiazole precipitate. The product may be recrystallized from 96% alcohol. M.P. 95–98° C. Analysis: N=16.79% (calc. 16.85%).

What we claim is:

1. The method which comprises reacting an amidoxime of the formula:

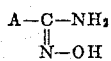

wherein A is selected from the group consisting of alkyl amino substituted alkyl, hydroxy substituted alkyl, alkoxy substituted alkyl, acylamino substituted alkyl, alkylamino substituted alkyl, dialkylamino substituted alkyl, aryl substituted alkyl, substituted aryl substituted alkyl, heterocyclic substituted alkyl, cycloalkyl, aryl, amino substituted aryl, hydroxy substituted aryl, alkoxy substituted aryl, acylamino substituted aryl, alkylamino substituted aryl, dialkylamino substituted aryl, alkyl substituted aryl, halogeno substituted aryl, heterocyclic, amino subsituted heterocyclic, hydroxy substituted heterocyclic, alkoxy substituted heterocyclic, acyl-amino substituted heterocyclic, alkylamino substituted heterocyclic, dialkylamino substituted heterocyclic, alkyl substituted heterocyclic and halogeno-substituted heterocyclic radicals, with an ester of the formula:

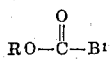

wherein B¹ is selected from the group consisting of alkyl, amino substituted alkyl, hydroxy substituted alkyl, alkoxy substituted alkyl, acylamino substituted alkyl, alkylamino substituted alkyl, dialkylamino substituted alkyl, aryl substituted alkyl, substituted aryl substituted alkyl, heterocyclic substituted aralkyl, cycloalkyl, aryl, amino substituted aryl, hydroxy substituted aryl, alkoxy substituted aryl, acylamino substituted aryl, alkylamino substituted aryl, dialkylamino substituted aryl, alkyl substituted aryl, halogeno substituted aryl, heterocyclic, amino substituted heterocyclic, hydroxy substituted heterocyclic, alkoxy substituted heterocyclic, acyl-amino substituted heterocyclic, alkylamino substituted heterocyclic, dialkylamino substituted heterocyclic, alkyl substituted heterocyclic, halogen substituted heterocyclic radicals, and O alkyl in the presence of a substance selected from the group consisting of alkali metal alcoholates and alkaline earth alcoholates so as to directly obtain ring closure and form the corresponding 1,2,4-oxadiazole of the formula:

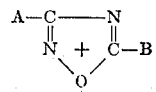

wherein A has the same definition as above, and wherein B is selected from the group consisting of alkyl, amino substituted alkyl, hydroxy substituted alkyl, alkoxy substituted alkyl, acylamino substituted alkyl, alkylamino substituted alkyl, dialkylamino substituted alkyl, aryl substituted alkyl substituted aryl, substituted alkyl, heterocyclic substituted alkyl, cycloalkyl, aryl, amino substituted aryl, hydroxy substituted aryl, alkoxy substituted aryl, acylamino substituted aryl, alkylamino substituted aryl, dialkylamino substituted aryl, alkyl substituted aryl, halogeno substituted aryl, heterocyclic, amino substituted heterocyclic, hydroxy substituted heterocyclic, alkoxy substituted heterocyclic, acyl-amino substituted heterocyclic, alkylamino substituted heterocyclic, dialkylamino substituted heterocyclic, alkyl substituted heterocyclic halogeno substituted heterocyclic radicals, and hydroxyl.

2. Method according to claim 1 in which said alcoholate is present in an amount of between about 0.1 and 2 moles per each mole of said amidoxime.

3. Method according to claim 1 in which said ester is present in an excess of about 0.1–1.5 mols calculated with respect to said amidoxime.

4. Method according to claim 2 in which said ester is present in an excess of about 0.1–1.5 mols calculated with respect to said amidoxime.

5. Method according to claim 1 in which the reaction is carried out at a temperature of about 50° C.–120° C.

6. Method according to claim 1 in which B¹ is alkylamino.

7. Method according to claim 1 in which A is alkoxy.

8. Method according to claim 1 in which A is halophenyl.

References Cited by the Examiner

Elderfield: Heterocyclic Compounds, vol 7 (New York, 1961), pages 508–511.

Groggins: Unit Processes in Organic Synthesis (New York, 1947), pages 635–638.

HENRY R. JILES, *Acting Primary Examiner.*

ALTON D. ROLLINS, RICHARD J. GALLAGHER, *Assistant Examiners.*